Oct. 10, 1967  T. DOMBROWSKI  3,345,892
WHEEL TURNING LATHE
Filed Feb. 21, 1967  5 Sheets-Sheet 1

INVENTOR
Theodor DOMBROWSKI
BY his ATTORNEY

INVENTOR
Theodor DOMBROWSKI
BY
Michael S. Striker
his ATTORNEY

United States Patent Office 3,345,892
Patented Oct. 10, 1967

3,345,892
WHEEL TURNING LATHE
Theodor Dombrowski, Erkelenz, Rhineland, Germany, assignor to Wilhelm Hegenscheidt Kommanditgesellschaft, Erkelenz, Rhineland, Germany
Filed Feb. 21, 1967, Ser. No. 617,605
Claims priority, application Germany, Mar. 5, 1966, H 58,712
14 Claims (Cl. 82—8)

ABSTRACT OF THE DISCLOSURE

A wheel turning lathe wherein the face plates are biased against thrust bearings provided on the headstocks so that the face plates cannot wobble during rotation with the wheels of a railroad wheel assembly whose axle is bent out of true. The thrust bearings are adjacent to the peripheries of the face plates and the drives which rotate the face plates subject them to axial stresses which urge the face plates against the respective thrust bearings.

The turning tools of the lathe are placed into substantial or exact alignment with the points where the face plates receive motion from the respective drives. The face plates are further mounted in radial bearings of the respective headstocks, either directly or through the intermediary of spindles which are bolted to and bias the face plates against the respecitve thrust bearings.

Background of the invention

The present invention relates to engine lathes in general, and more particularly to improvements in heavy-duty lathes which are utilized for turning of wheels on wheel assemblies of railroad vehicles. In such assemblies, the wheels are mounted at the ends of an axle which undergoes flexing and causes the wheels to behave not unlike wobble plates when the assembly is installed in and rotates between the face plates of a turning lathe.

In presently known wheel turning lathes, the face plates are bolted to flanges provided at the front ends of spindles which are journalled in headstocks disposed at the opposite axial ends of the wheel assembly whose wheels require treatment. The spindles are mounted in radial and axial bearings but invariably undergo considerable flexing when the lathe is in actual use because the face plates tumble in response to engagement with wheels whose axle is bent. Slight bending or flexing of the axle is unavoidable and, therefore, the bearings for the spindles must take up extremely large stresses which are detrimental to such bearings and which also tend to loosen the connections between the spindles and the respective face plates.

Proposals to prevent excessive flexing include the utilization of large-diameter spindles and of large-diameter flanges which are integral with the spindles and carry the face plates. Of course, this contributes to the weight, bulk and particularly to the cost of wheel turning lathes. Proposals to utilize very thick and exceptionally rigid face plates have also failed to meet with success because the distance between the point where the turning tool engages a wheel and the central plane of the main bearing for the spindle is increased with attendant increase in bending stresses.

A wheel assembly is a highly complicated and relatively unstable rotary body. During turning of wheels, the ends of the axle are held by centers and even minimal flexing of the axle (for example, by as little as 0.5 mm.) will place the wheels into planes which are not exactly parallel with the planes of unstressed face plates. The face plates are provided with jaws which engage and transmit torque to the rims of wheels so that the axle is held between the centers and the wheels rotate with the face plates. The jaws cause the face plates to tilt with reference to their spindles and to wobble when the lathe is in actual use. The direction of bending stresses varies continuously when the wheels rotate and the resulting composite stresses upon the face plates are particularly strong in the axial direction of the spindles. Additional bending or flexing stresses develop when the wheels of a revolving assembly are engaged by the turning tools. The magnitude of such additional stresses depends on the distance between the point of engagement with a tool and the bearings for the spindle of the adjacent face plate. Therefore, the designers of wheel turning lathes attempt to place the wheels as close to the main bearings as possible and to utilize bearings adapted to take up very substantial stresses which are due in part to flexing of the axle and in part to engagement between the wheels and the turning tools. Of course, the distance between the wheels and the bearings cannot be reduced at will; it depends to a large extent on the configuration and dimensions of the headstocks for the spindles of the face plates.

The situation is much simpler in so-called carousel lathes wherein the face plate rotates about a vertical axis. The weight of the face plate and of the workpieces mounted thereon causes the face plate to bear against its bearings and to reduce wobbling. The workpieces are not deformed and they do not tend to bring about tumbling of the face plate. On the other hand, the face plates in all recent types of wheels turning and truing lathes rotate about horizontal axes and, therefore, flexing of axles during turning is a very important factor. Satisfactory compensation for such flexing presents a serious problem in turning of wheel assemblies.

Accordingly, it is an important object of the present invention to provide a novel and improved wheel turning lathe wherein the face plates which engage and transmit torque to the wheels are held against excessive wobbling so that the connections between such face plates and their spindles are much less likely to become loose than in presently known wheel turning lathes.

Another object of the invention is to provide a novel mounting for the face plates of wheel turning lathes and to eliminate excessive stressing of main bearings for the face plates.

A further object of the invention is to provide a novel drive for the face plates of wheel turning lathes or analogous heavy-duty machine tools and to construct and assemble the drive in such a way that its components contribute to elimination of wobbling.

An additional object of the invention is to provide a wheel turning lathe with spindles which, in addition to performing all functions of spindles in conventional turning lathes, also contribute to elimination of wobbling and flexing of face plates when the lathe is in actual use.

An ancillary object of the invention is to provide a wheel turning lathe wherein the turning tools and the drives for face plates cooperate to eliminate or to contribute to elimination of wobbling of the face plates.

A concomitant object of the invention is to provide a wheel turning lathe wherein the spindles and the face plates are subjected to permissible flexing stresses and wherein all such stresses which act in the axial direction of the face plates are taken up by the headstocks.

Still another object of the invention is to provide a wheel turning lathe whose operation is quieter and which is less prone to vibrate than all such conventional lathes of which I am aware at this time.

Summary of the invention

Briefly outlined, one feature of my invention resides in the provision of a wheel turning lathe or an analogous heavy-duty machine tool which comprises a headstock or a similar strong support, a face plate rotatable with reference to the headstock about a horizontal axis and having a peripheral portion which is remote from such axis, a large-diameter thrust bearing interposed between the headstock and the face plate adjacent to the peripheral portion of the face plate, and biasing means for urging the face plate against the thrust bearing to prevent wobbling of the face plate.

The biasing means comprises a spindle which is coaxially fastened to the face plate and rotates in radial and thrust bearings provided in the headstock. The radial bearings may be provided exclusively between the headstock and the spindle. Alternatively, the face plate may be formed with an integral axial extension which is rigidly secured to the front end portion of the spindle and rotates in a radial bearing provided therefor in the headstock.

The novel features which are considered as characteristic of the invention are set forth in particular in the appended claims. The improved machine tool itself, however, both as to its construction and the mode of operating the same, together with additional features and advantages thereof, will be best understood upon perusual of the following detailed description of certain specific embodiments with reference to the accompanying drawing.

*Description of the preferred embodiments*

Figure 1:
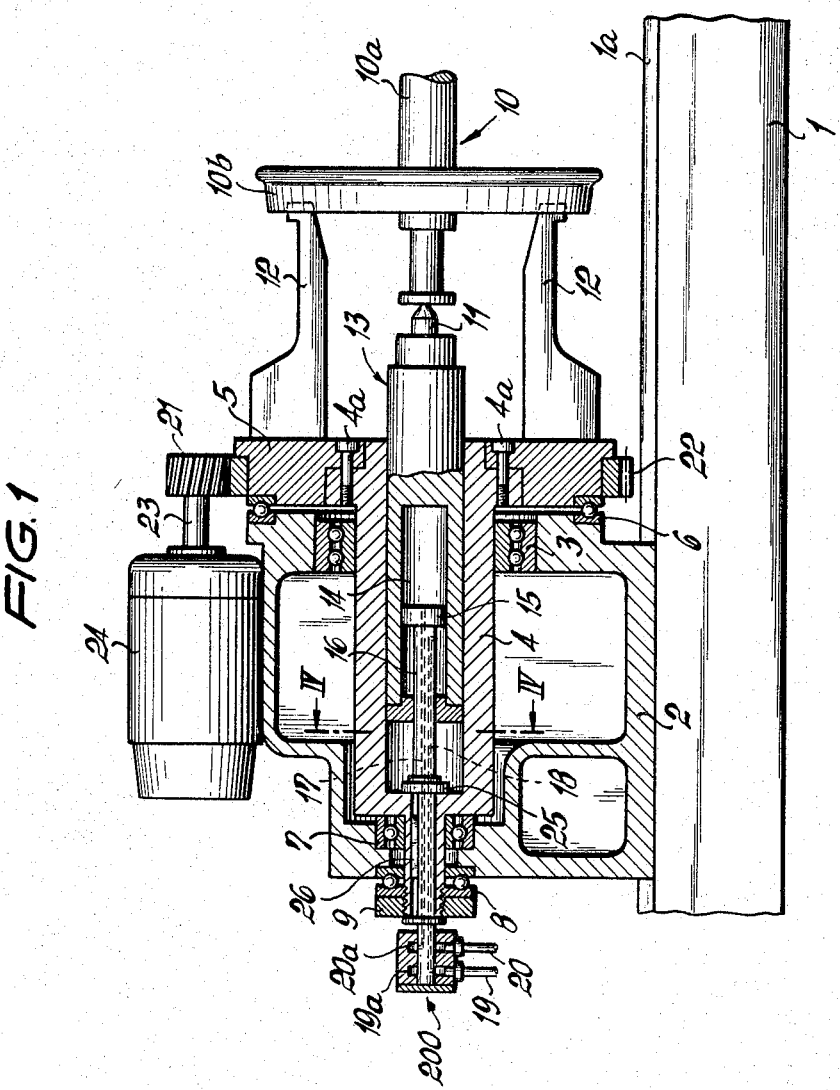
FIG. 1 is an axial section through one headstock of a wheel turning lathe which embodies one form of my invention.

Referring first to FIG. 1, there is shown a portion of a wheel turning lathe which comprises a frame including a base plate 1 provided with ways 1a for a support here shown as a hollow headstock 2. The latter can be fixed to the base plate 1 in selected positions of adjustment and is provided with radial antifriction bearings 3, 7 for the front and rear end portions of a hollow spindle 4 which is rotatable about a horizontal axis. The front end portion of the spindle 4 is rigidly secured to an annular face plate 5 by means of threaded bolts 4a or analogous fasteners. In accordance with an important feature of my invention, the structure shown in FIG. 1 further comprises a large annular thrust bearing or axial bearing 6 which is interposed between the face plate 5 and headstock 2 and is adjacent to the periphery of the face plate. The spindle 4 and the fasteners 4a form part of the means for biasing the face plate 5 against the right-hand race of the thrust bearing 6. A second thrust bearing 8 is disposed between the rear end portion of the spindle 4 and the headstock 2. A nut 9 which meshes with an externally threaded part of the spindle 4 serves as a prestressing means by bearing against the left-hand race of the thrust bearing 8. At the same time, the nut 9 stresses the bearing 6 by urging the face plate 5 in a direction to the left, as viewed in FIG. 1.

The aforementioned biasing means further comprises a center 13 whose conical tip 11 engages the left hand end of an axle 10a forming part of a railroad wheel assembly 10 which further includes two multiple-wear wheels 10b. The rim of the wheel 10b shown in FIG. 1 is engaged from inside by motion transmitting jaws 12 provided on and extending beyond the right-hand side of the face plate 5. The jaws 12 are movable substantially radially of the face plate 5 so that they can be placed into or moved away from torque-transmitting engagement with the wheel assembly 10. The tip 11 centers the axle 10a and tends to move the center 13 in a direction to the left whereby the stresses transmitted by the axle 10a contribute to the biasing action which causes the face plate 5 to bear against the thrust bearing 6.

Figure 4:
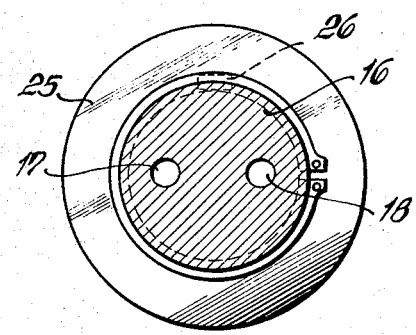
FIG. 4 is an enlarged fragmentary transverse sectional view as seen in the direction of arrows from the line IV—IV of FIG. 1.

The center 13 comprises two coaxial portions 14, 15 which are slidable with reference to each other. The portion 14 is constituted by a cylinder which is slidably fitted into an axial bore of the spindle 4, and the portion 15 is a piston whose piston rod 16 extends through and beyond the left-hand end portion of the spindle 4. The cylinder 14 is of the double-acting type and its chambers can receive or discharge a hydraulic fluid through bores 17, 18 (see also FIG. 4) provided in the piston rod 16. These bores communicate with annular grooves 20a, 19a provided in a stationary head 200 which accommodates the left-hand end of the piston rod 16. The grooves 19a, 20a can receive or discharge fluid via conduits 19, 20 which are connected to a suitable distributor valve, not shown.

A stress-transmitting nut 25 meshes with or is otherwise affixed to the piston rod 16 against axial movement. This nut 25 bears against an internal annular shoulder of the spindle 4 when the tip 11 of the center 13 bears against the axle 10a. It is assumed that both chambers of the cylinder 14 are filled with noncompressible fluid so that the portions 14, 15 of the center 13 can be said to form a rigid unit as long as the fluid remains entrapped in the cylinder chambers. The piston rod 16 is provided with an axially parallel groove for a key 26 which is mounted in the left-hand end portion of the spindle 4 and prevents rotation of the piston 15 with reference to the face plate 5. When the latter rotates to transmit torque to the wheel 10b through the intermediary of its jaws 12, the spindle 4 shares such rotary movement and rotates with the piston rod 16, nut 9 and tip 11.

The drive means for the face plate 5 comprises a ring gear 22 which surrounds a portion of its periphery and meshes with a smaller gear 21 affixed to the output shaft 23 of a prime mover here shown as a variable-speed electric motor 24.

Figure 3:
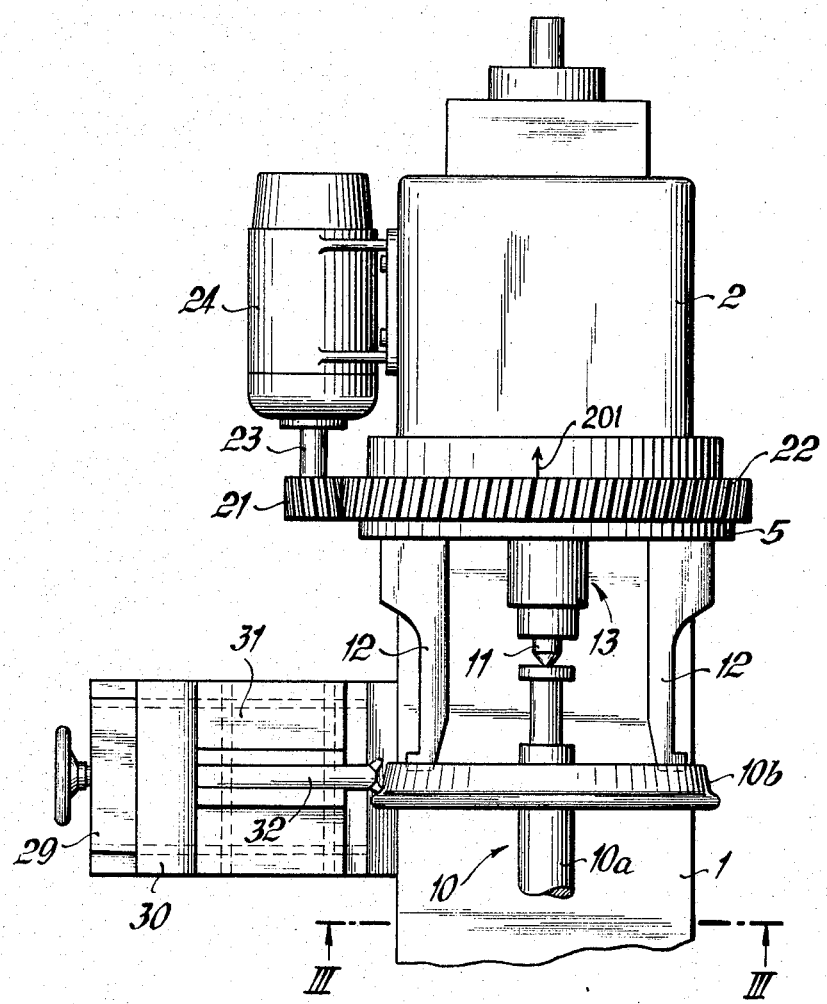
FIG. 3 is a fragmentary top plan view of the lathe shown in FIG. 1.

It is to be noted that FIG. 1 shows substantially one-half of a wheel turning lathe. The other half is preferably a mirror symmetrical image of the structure shown in FIG. 1 and also comprises a face plate which rotates the right-hand wheel 10b (not shown) of the wheel assembly 10 and a center which engages the right-hand end of the axle 10a In addition, the lathe comprises two or more material removing or turning tools 32 (see FIGS. 3 and 3a) which treat the surfaces of the wheels 10b while the assembly 10 rotates with the face plates 5. In accordance with a presently preferred embodiment of my invention, and as best shown in FIG. 3, the teeth of the gears 21, 22 are inclined with reference to the axis of the spindle 4 and urge the face plate 5 against the thrust bearing 6 when the motor 24 is in operation. The direction of the force which causes the face plate to bear against the bearing 6 is indicated in FIG. 3 by an arrow 201.

Figure 3A:
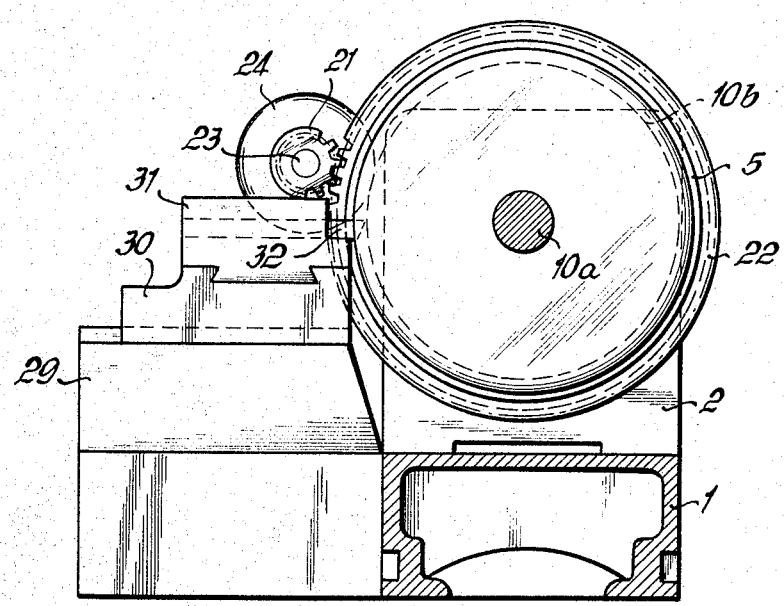
FIG. 3a is a transverse vertical section as seen in the direction of arrows fom the line III—III of FIG. 3.

The tool 32 of FIGS. 3 and 3a is mounted on a bracket 29 which is affixed to the base plate 1 and supports a carriage 30 which is movable at right angles to the axis of the face plate 5. The carriage 30 supports a second carriage 31 which is movable in parallelism with the axis of the face plate 5 and supports the tool holder for the tool 32. As shown in FIG. 3 or 3a, the point of engagement between the tool 32 and wheel 10b is in substantial alignment with the point where the teeth of the gears 21, 22 mesh. This is of advantage because the thrust bearings 6 are subjected to greater axially oriented stresses. All such axial stresses which are transmitted to the face plate 5 by its jaws 12 are transmitted directly to the thrust bearing 6, together with all such axial stresses which arise in response to engagement between the turning tool 32 and the wheel 10b.

The output shaft 23 of the motor 24 preferably extends in parallelism with the axle 10a to drive the gear 21 which meshes with the gear 22 on the other face plate 5.

Figure 2:
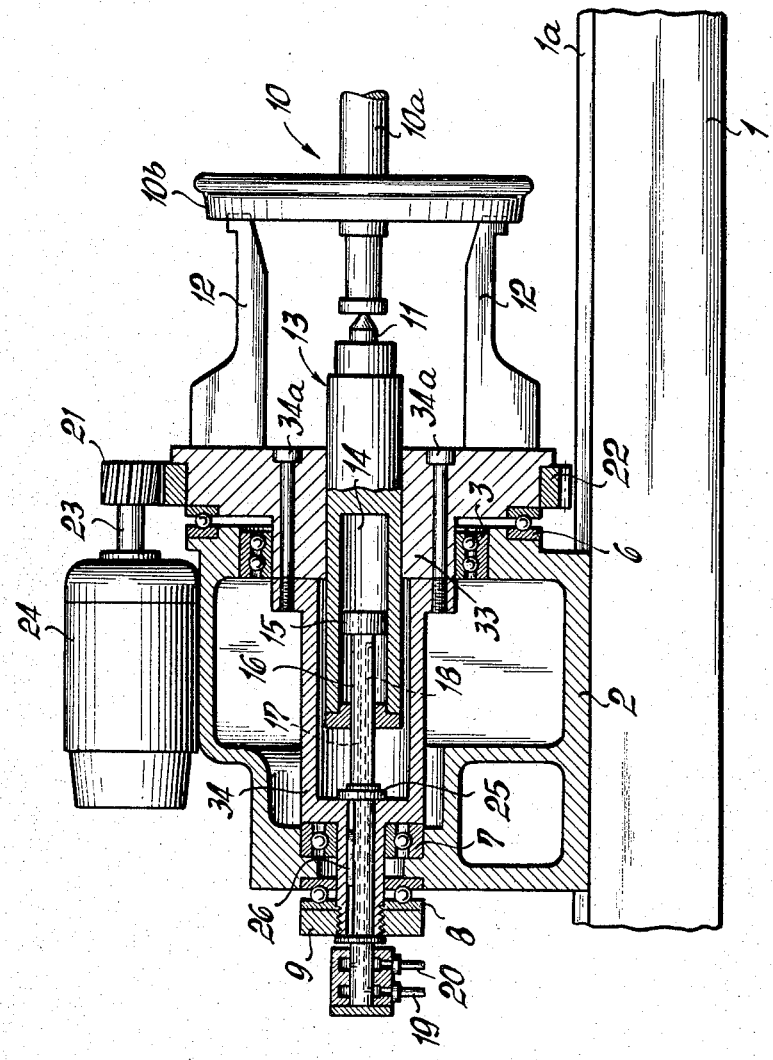
FIG. 2 is a similar fragmentary axial sectional view of a modified wheel turning lathe.

It will be noted that FIGS. 1 and 2 show the motor 24 in a position which is different from the actual position of FIGS. 3 and 3a. This was done for the sake of clarity.

FIG. 2 illustrates one headstock 2 of a slightly modified wheel turning lathe. All such parts which are identical with or clearly analogous to the parts described in connection with FIGS. 1, 3, 3a and 4 are denoted by similar reference characters.

The face plate 27 of FIG. 2 comprises an axial extension or hub 33 which is rotatable in the large right-hand radial bearing 3. Bolts or similar fasteners 34a connect the extension 33 with the right-hand end portion of a spindle 34 which is rotatable in the bearings 7, 8 in the same way as described in connection with FIG. 1. It will be seen that the right-hand portion or cylinder 14 of the center 13 is mounted directly in the axial bore of the extension 33 and projects beyond the right-hand side of the face plate 27 to engage its tip 11 with the adjoining end of the axle 10a. The axial position of the piston 15 with reference to the cylinder 14 will be changed when the operators wish to move the tip 11 into or away from engagement with the axle 10a.

The nut 9 constitutes a prestressing means by urging the face plate 27 against the thrust bearing 6. At the same time, the nut 9 stresses the thrust bearing 8.

Figure 5:
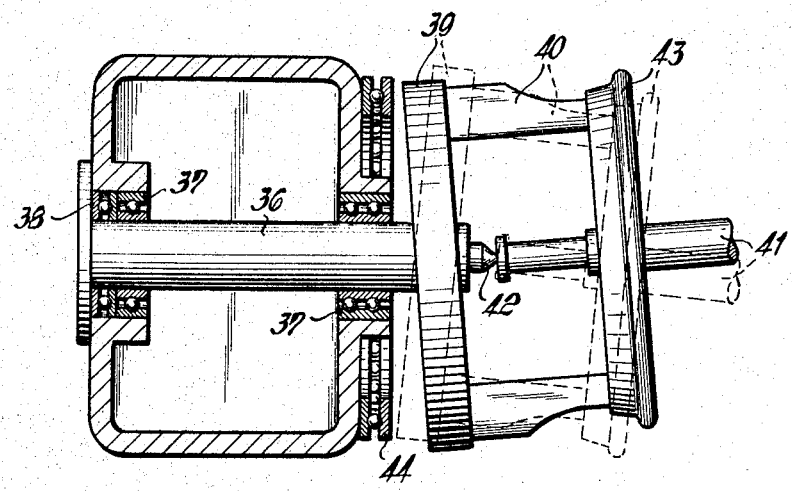
FIG. 5 is a somewhat schematic partly elevational and partly sectional view of one headstock in a conventional wheel turning lathe.

The advantages of the thrust bearing 6 and of means for biasing the face plate 5 or 27 against such thrust bearing will be more readily appreciated with reference to FIG. 5 which shows two extreme positions of a face plate 39 and wheel 43, both greatly exaggerated for the sake of clarity. The face plate 39 is shown as being mounted at one end of a spindle 36 in such a way that it is axially spaced from the thrust bearing 44. The spindle 36 rotates in a thrust bearing 38 and two radial bearings 37, and its axis is horizontal. The center 42 engages one end of the axle 41 and the jaws 40 of the face plate 39 engage the wheel 43 so that the wheel rotates with the face plate. The center 42 cooperates with the other center (not shown) to engage the axle 41 at both ends and this axle is flexed, not only by gravity but also due to compressive stress transmitted by the centers 42. At least some flexing of the axle 41 is unavoidable and must be considered in designing of a wheel turning lathe. When the assembly including the axle 41 rotates, the wheel 43 acts not unlike a wobble plate and transmits to the face plate 39 enormous stresses which cause the face plate to tumble and to loosen its connection with the spindle 36. By abutting against the thrust bearing 6, the face plates 5 and 27 of FIGS. 1 and 2 cannot tumble and their connections with the spindles 4 and 34 remain intact. Tumbling of face plates 5 and 27 is further prevented by the provision of biasing means which subjects the thrust bearings 6 to an initial stress. The main difference between the structures of FIGS. 1 and 2 is seen to reside in that the integral extension 33 of the face plate 27 is mounted directly in the radial bearing 3 of the headstock 2 so that the fasteners 34a of FIG. 2 are less likely to become loose. Even the strongest mechanical connection between a face plate and its spindle is likely to become loose if the face plate is subjected to stresses of a magnitude transmitted by the wheels of a railway wheel assembly. Furthermore and since the diameter of the radial bearing 3 in FIG. 2 is larger than in FIG. 1, the provision of the extension 33 contributes greatly to the safety, accuracy and longer useful life of the lathe shown in FIG. 2. Since the extension 33 projects in a direction to the left, i.e., away from the assembly 10, its provision does not increase the distance between the thrust bearing 6 and the adjacent wheel 10b. Moreover, the radial bearing 3 need not be placed at a greater distance from the face plate 27 and wheel 10b.

The novel mounting of the face plates 5 and 27 also protects the spindles 4 and 34 against flexing.

An important advantage of initial stressing of the thrust bearings 6 is seen to reside in that the face plates continue to bear against such bearings when the assemblies 10 are removed from the lathe. Such initial stressing also prevents axial movements of face plates in response to axial displacement of wheels 10b during engagement with turning tools 32. As the axial pressure between the tips 11 of centers and the axle 10a increases, the bias of face plates 5 or 27 against the adjoining thrust bearings 6 also increases so that the face plates are held against wobbling with a force which increases with increasing axial stress upon the centers.

Another important advantage of my wheel turning lathe is that the spindles 4 and 34 are not subjected to any or are subjected to minimal flexing. Therefore, such spindles need not consist of high-quality material and their dimenions will be smaller than in presently known wheel turning lathes wherein the spindles must resist exceptionally large flexing stresses. Furthermore, and since the thrust bearings 6 engage with the peripheral portions of the face plates 5 and 27, and since the lathe preferably utilizes large radial (main) bearings 3, uncontrolled wobbling and/or flexing of face plates and their spindles is impossible in normal operation of such machine tools. Small inaccuracies in machining of the face plates and/or their spindles can be compensated for by elastic deformation. The bearings at the rear ends of the spindles 4 and 34 are subjected to relatively small stresses and their main function is to properly guide the spindles with a minimum of friction.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a heavy-duty lathe, particularly in a wheel turning lathe, the combination comprising a support; a face plate rotatable with reference to said support about a fixed axis and having a peripheral portion remote from said axis; a thrust bearing interposed between said face plate and said support adjacent to said peripheral portion; and biasing means for urging said face plate against said thrust bearing.

2. The combination as defined in claim 1, wherein said biasing means comprises a center coaxial with and extending beyond one side of said face plate.

3. The combination as defined in claim 1, wherein said biasing means comprises a spindle rotatable in said support about said fixed axis and fastener means securing said spindle to said face plate, and further comprising at least one radial bearing interposed between said spindle and said support.

4. The combination as defined in claim 1, wherein said face plate comprises a smaller-diameter extension rotatable in said support and further comprising a radial bearing interposed between said said extension and said support, said biasing means comprising a spindle rotatable in said support about said axis and fastener means securing said spindle to said extension.

5. The combination as defined in claim 1, further comprising drive means for rotating said face plate including a first gear provided on and coaxial with said face plate, a second gear meshing with said first gear, and a prime mover for rotating said second gear, said gears having intermeshing teeth which are so inclined with reference to said axis that they assist said biasing means in urging said face plate against said thrust bearing in response to rotation of said second gear.

6. The combination as defined in claim 5, further comprising a material removing tool axially spaced from said face plate opposite said thrust bearing, and means for supporting said tool in substantial alignment with the point of engagement between the teeth of said gears.

7. The combination as defined in claim 1, wherein said biasing means comprises a hollow spindle rotatable in said support about said axis and having a front end portion adjacent to said face plate and a rear end portion, fastener means securing said front end portion to said face plate, a center received in said spindle and extending beyond that side of said face plate which faces away from said thrust bearing, means for transmitting axial stresses from said center to said spindle in a direction toward said second end portion so that such stresses urge said face plate against said thrust bearing, and prestressing means operating between said support and said spindle for urging said face plate against said thrust bearing independently of said stress transmitting means.

8. The combination as defined in claim 7, wherein said face plate comprises an extension rotatable in said support about said axis, said fastener means being provided to secure the front end portion of said spindle to said extension and further comprising first and second radial bearings respectively interposed between said extension and said support and between said spindle and said support.

9. The combination as defined in claim 8, wherein said center comprises a portion which is received in an axial bore of said extension.

10. The combination as defined in claim 7, further comprising radial bearings interposed between the end portions of said spindle and said support.

11. The combination as defined in claim 7, wherein said center comprises coaxial first and second portions one of which is slidably telescoped into the other thereof, said first portion extending beyond said side of said face plate, and said second portion being provided with said stress transmitting means.

12. The combination as defined in claim 1, wherein said biasing means comprises a spindle rotatable in said support about said axis, fastener means securing said spindle to said face plate, a second thrust bearing interposed between said spindle and said support and prestressing means for simultaneously urging said face plate and said spindle against the respective thrust bearings.

13. The combination as defined in claim 1, wherein said axis is horizontal and wherein said face plate comprises motion transmitting means engageable with one wheel of a railroad wheel assembly to rotate such wheel, said biasing means comprising a center engageable with one end of the axle in an assembly one wheel of which is engaged by said motion transmitting means, said center being arranged to transmit to said face plate axial stresses received from the axle of said wheel assembly whereby such stresses assist the action of said biasing means in urging said face plate against said thrust bearing.

14. The combination as defined in claim 1, wherein said support is constituted by a headstock and further comprising frame means supporting said headstock for movement in parallelism with said axis.

References Cited

UNITED STATES PATENTS 3,170,348 2/1965 McFerren _____ 82—28
3,194,093 7/1965 Binns _____ 82—28

FOREIGN PATENTS 370,215 2/1923 Germany.

HARRISON L. HINSON, *Primary Examiner.*